Dec. 30, 1947.  L. C. WERNER  2,433,497
MEANS AND METHOD OF MAKING ELECTRODE STRANDS
Original Filed Sept. 27, 1941
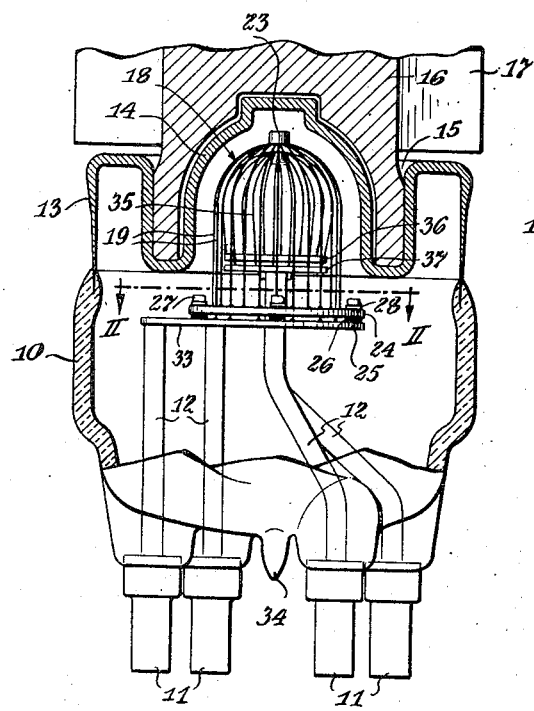
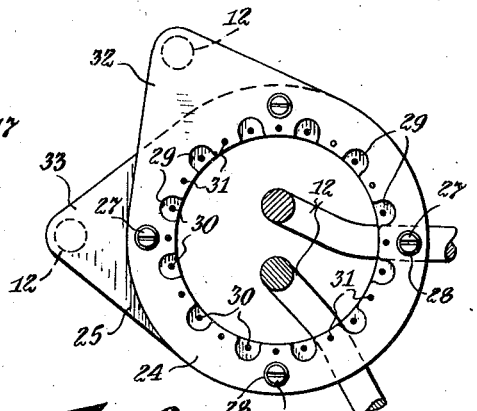
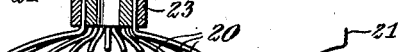
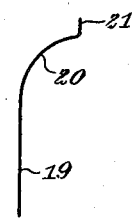
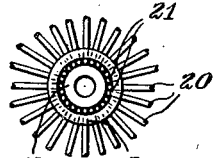
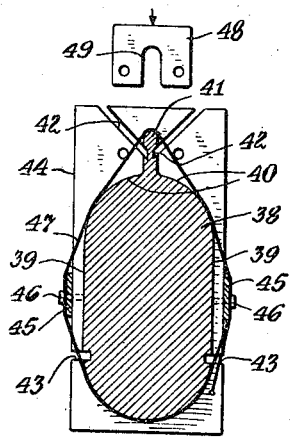
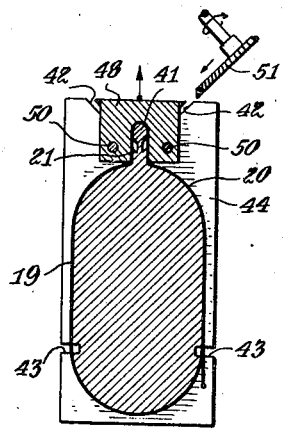
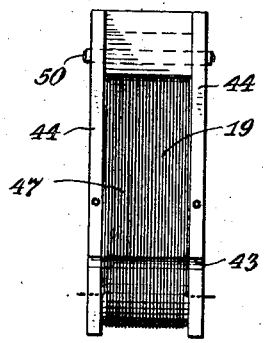
INVENTOR
L. C. WERNER.
BY
ATTORNEY Patented Dec. 30, 1947

2,433,497

UNITED STATES PATENT OFFICE 2,433,497

MEANS AND METHOD OF MAKING ELECTRODE STRANDS

Leo C. Werner, Bloomfield, N. J., assignor to Westinghouse Electric Corporation, East Pittsburgh, Pa., a corporation of Pennsylvania Original application September 27, 1941, Serial No. 412,546, now Patent No. 2,398,609, dated April 16, 1946. Divided and this application July 14, 1943, Serial No. 494,621

6 Claims. (Cl. 140—71)

This invention relates in general to means and method of making electrode strands, and is a division of the subject-matter of application, Serial No. 412,546, filed September 27, 1941 and now issued as Patent Number 2,398,609, April 16, 1946.

Some attempts have heretofore been made to construct and use electrodes of a dome-like or bird-cage formation. Difficulties have arisen both in the manufacture of the strands forming such an electrode and in the assembly and retention of those strands in the electrode structure. In such patents as 2,238,596 of April 15, 1941, in the name of I. E. Mouromtseff et al., assigned to the same assignee as the present application, a bird-cage structure of cathode is illustrated wherein the strands forming the same are secured at their upper ends in a contiguous grouped arrangement by means of a length of wire coiled around the ends of said strands binding them together. It has been found that internal stresses are created in such an assembly which either immediately or after a short period of time result in the strands of the electrode becoming displaced from their original position, getting out of parallel and affecting the tube characteristics.

Attempts have been made in connection with such electrodes, as shown in said patent, to weld a slip coil, comprising a spirally wound binding wire, onto the contiguous parts of the strands. While the welding of a slip coil has obtained a better electrical contact, the weld cannot be confined sufficiently, but burns down the side of the slip coil to the bottom of the spiral winding, setting up stresses in the strands of the electrode which result in as bad or worse displacement and deformation as that explained above. This defect has been overcome to some extent in grids by spot welding hoops at intervals of height of the grid. It must also be noted in the patent referred to that the structure disclosed is a cathode and not a grid. This fact is pointed out in that a feature of the present invention is the construction of a grid of a character enabling the grid to form part of an electrical circuit and be heated by current travelling through the grid wires during the manufacture of the electronic device. It is accordingly not possible to hold the strands with hoops either in a cathode or in my improved grid. The heating of the grid is performed at the same time that the cathode is similarly heated, and consequently the electronic device may be exhausted in minimum time by virtue of the greater amount of heat developed by lighting both electrodes at the same time.

Accordingly, an object of the present invention is to provide an improved method of manufacturing electrode strands.

More specifically, an object of the invention is to rapidly and accurately form a plurality of strands in a group.

Another object of the invention is to form electrode strands from parts of convolutions of wire.

A further object of the invention is to provide slack in the convolutions of wire and utilize the slack by forcing the wire into depressions.

Yet another object of the invention is to provide improved means for forming the wire in desired configuration of strands.

Still further objects of the invention will appear as the description proceeds, both by direct recitation thereof and by implication from the context.

Referring to the accompanying drawing, in which like numerals of reference indicate similar parts throughout the several views:

Figure 1 is a central vertical section of an electronic discharge device and showing my invention applied thereto;

Figure 2 is a cross-sectional view on line II—II of Fig. 1;

Figure 3 is a vertical sectional view of the peak end of the dome-like bird-cage grid formation of Fig. 1;

Figure 4 is a plan of the portion of the grid shown in Fig. 3;

Figure 5 is an elevation of one of the grid strands;

Figure 6 is a vertical sectional view of a means for forming strands from convolutions of wire, taken in the plane of a convolution of the wire;

Figure 7 is a view similar to Figure 6 and showing the slack in the convolutions of wire forced into areas of depression in the mandrel for shaping the wire prior to cutting the formed strands therefrom; and Figure 8 is an edge view of the forming means with the convolutions of wire thereon.

Referring to said drawings, a part of an electronic device, generally identified as a power tube, is illustrated showing my invention as part thereof. It should be understood, however, at the outset that my invention is applicable to other electronic devices than this particular power tube. The specific tube shown comprises a glass or other ceramic casing portion 10, here shown as part of the evacuated envelope, and as also constituting the base portion for the device and having appropriate contact prongs 11 protruding from the bottom thereof with conducting posts 12 extending upwardly within the interior of said base portion 10. At the upper rim of the base portion 10 there is sealed into the glass or other ceramic a feather edge of a connecting ring-like portion 13 to a dome-like anode 14 of suitable metallic material adapted to the purpose. A part of the anode proper is shown re-entrant with respect to the connecting ring portion 13, thereby providing an annular upwardly open groove 15 within which is situated a member 16 hollowed out to substantially fit the dome-like structure of the anode and provided with fins 17 for cooling purposes.

Within the dome-like cavity formed by anode 14, and preferably having a contour or formation likewise of the same dome-like character paralleling the inner dome-like surface of the anode, so as to be evenly spaced therefrom, is a bird-cage dome-like grid 18 constituting an essential feature of the present invention.

The said grid comprises a plurality of similar strands evenly distributed circumferentially and providing lower portions 19 which are upright and parallel to each other. Toward the top of the strands the same curve upwardly inwardly, as at 20, converging toward each other toward a common central point on the central axis of the grid. Slightly away from such central axis, the strands are bent upward forming upright neck portions 21 which are likewise parallel to each other and are arranged successively contiguous to each other and contiguous to a cylindrical core 22 axially disposed with respect to the grid and of a length substantially equal to the length of said neck portions 21 of the strands. On the outside of the strands is situated a gripping collar 23 likewise of substantially the length of the neck portions 21 of the strands. The collar 23 and concentrically situated core 22 provide just ample room therebetween for the neck portions 21 of the strand and grip said neck portions in the assembly as clearly shown in Figures 3 and 4. Preferably, after the neck portions 21 of said strands, core 22 and collar 23 are assembled, the same are unified by welding at the outer ends of the neck portions 21 of said strands. The presence of the core 22 and collar 23 will prevent the arc performing the weld from travelling down to the curved portion 20 of the strands, and as a matter of fact, the arc and weld will be confined to the extreme end of the core and collar well away from the lower ends of said core and collar and from the part of the strands where emerging therefrom or where protruding therebelow. Accordingly, while the welding secures the desired unification between the parts mentioned, yet internal stresses created within the strands will be confined to the extreme upper ends of the neck portions thereof and by virtue of the gripping action at the lower ends of the core and collar and the contiguous situation of the neck portions of the strands between the core and collar, no deflection or distortion will result in the exposed parts of the strands. By virtue of the construction thus described, the exposed portions of the strands will remain in their given positions and accordingly will remain evenly distributed with the lower parallel portions remaining parallel and equal distances apart at all times.

At the lower part of the grid, transverse thereto, are situated two flat annular members which may be conveniently referred to as rings 24, 25. These rings are separated physically and electrically by intervening insulators 26 and are held in such position by suitable screws, or the like, 27 extending through said insulators and insulated from the plate under the head of said screws, as by insulating washers 28. The inner periphery of the upper ring 24 is provided with a series of evenly spaced cutouts 29 corresponding to the spacing of alternate grid strands, thereby enabling such alternate grid strands to pass through the cutouts 29 without engaging the upper ring whereby the lower ends of those alternate strands may be introduced into and secured within holes 30 arranged in a circular series near the inner periphery of the lower ring 25. The intermediate strands of the grid are introduced into holes 31 in the area of the ring intervening between the said cutouts, said holes likewise being in a circular series the radius of curvature of the series for both rings preferably being identical whereby all of the strands will have equal spacing from the axis of the grid where attached to their respective rings. At different parts of the peripheries of the said rings, the same are formed with outward extensions 32, 33, respectively, forming means for attachment of the appropriate conducting posts 12.

During the manufacture of the electron discharge device, current is applied by way of one post 12 to one of the rings, for instance ring 25, passes upwardly of the grid through the alternate strands 30 to the peak where those strands make electrical contact with the intermediate strands and is conducted thereby downwardly to ring 24 and thence back to the current source by way of the post 12 connected with that ring. This heating is effected at the same time that heat is applied to the filament and is a material factor in reducing the exhaust time for the device to a minimum. Tubulation 34 is provided in the base portion 10 of the envelope as a means for evacuation, said tubulation being sealed after the exhaust process is completed.

The filamentary cathode, now identified by reference numeral 35, has a similar construction to that just given in description of the grid. That is to say, said filament is supported by two conductive rings 36, 37 which are parallel but insulated one from the other and connected with alternate and intermediate strands of the filament, further description whereof is deemed unnecessary, except to say that the neck portions of the strands forming said cathode are bent downwardly instead of upwardly and are appropriately secured to a core and gripped by a collar if desired just as described above. It will now be recognized that the filament is of dome shape with the general contour of its upper end semi-spherical and that the grid has its general contour at the inside toward the filament likewise semi-spherical. This enables the grid and filament to be closely spaced and to have substantial parallelism throughout the portion of the grid which is opposed by the filament.

In connection with my improved electron discharge device, wherein are required grid strands of the special shape shown in Figure 5, I have also provided a means and method of making the same. I provide a mandrel 38 having straight sides 39 to conform the wire with a straight portion to provide portion 19 thereof heretofore described. The upper end of the mandrel provides rounded shoulders 40 to conform the wire to form the curved or arcuate portion 20 of the strand. At the middle and top of the mandrel is provided a cross rib 41 standing upright so as to present an outer upright surface to conform the wire to form the upright neck portion 21 of the strand. Said rib is of greater height than the ultimately desired height of the neck portion 21 of the strand, a saw-slit 42 being provided on opposite sides of the rib a distance above the shoulder 40 equal to the desired height of neck 21 to be produced. Toward the bottom of the mandrel are provided side saw-slits 43, 43, at a distance below shoulder 40 equal to the desired length of the straight portion 19 of the strand. Below these side saw-slits the mandrel is preferably semi-cylindrical in order to facilitate winding the wire therearound.

At the ends of the mandrel are end plates 44 which are larger than the cross-sectional area of the mandrel so as to form a flange around the same to prevent the wound wire from slipping off the ends of the mandrel. Said end plates 44 are also conveniently utilized to mount slack-producing cross bars 45. These bars may be temporarily held in place by screws 46 passing therethrough and entering the edges of the said end plates. It is preferable that the cross bars be applied where they will introduce the least bending of the wire when wound around the mandrel, and I have accordingly shown them applied in Figure 6 about midway of the height of the flat sides of the mandrel. In the process of manufacture the wire from which the strands are made, is wound in continuous convolutions 47 around the mandrel while the cross-bars are in position. Accordingly, each convolution is given a predetermined amount of slack where it is caused to diverge from the mandrel to pass over the said cross-bars. The amount of slack is arranged to equal the length required to subsequently force the convolutions into the cavity or depression formed by the rounded shoulder and rib of the mandrel. In the process of manufacture, after the convolutions have been completed, the cross-bars 45 are detached and removed, thus making the slack available in the several convolutions. The next step is to propel a die 48 downwardly over the rib 41, said die having a bottom slot 49 of appropriate size and shape to receive the rib and accommodate the thickness of wire situated on the rib, pressing the wire inwardly against the rib as said die descends. The parts are proportioned so the die will cause the wire to snugly engage both side faces of the rib and both shoulders, and will take up the slack in the wire and cause the wire to also snugly engage the straight side portions 39 of the mandrel. The die is retained in place, as by pins 50, and the assembled mandrel, die and formed wire thereon are heat treated as usual in preparation of grid wires. The heat treatment obtains a permanent set of the configuration given to the wire on the mandrel, and after removal from the oven or other place of heat treatment, the die 48 can be removed and the convolutions will remain snugly engaging the mandrel in view of their rigidity developed by the treatment. A cutter 51 is now applied to the convolutions at the proper places to sever the same at the upper end of neck 21 and at the lower end of straight portion 19. As previously indicated saw-slits 42 and 43 are provided in the neck and mandrel, and those slits also extend into the end plates 44 thereby enabling the cutter 51 to perform its function upon the convolutions at the prescribed places.

It will accordingly be seen that I have provided a convenient method for the manufacture of the specially formed strands of my improved electrode, and that the electrode is one wherein the foregoing objects are accomplished both in the electrode per se and in the combination thereof with the other electrodes.

I claim:

1. A method of manufacture of electrode strands, comprising winding wire in convolutions around a mandrel having a depression, forcing the wire into the depression after winding of the convolutions is completed and holding the wire depressed, heat-treating the wire while held depressed for forming the wire and cause it to retain the shape given while held depressed, and severing the wire at parts of the convolutions on opposite sides of the depression after it is formed in the shape desired by the heat treatment.

2. A method of manufacture of electrode strands, comprising winding wire in convolutions on a mandrel having areas substantially conforming to the desired strand shape and including formative areas of depression into which the strands are to be bent, increasing the circumferential length of convolutions to accord with the length needed to depress into said depressions, partially releasing the wound wire to create slack to the extent of the said increase of circumferential length of convolutions, and taking up said slack and forming the convolutions in the formative areas of depression of the mandrel.

3. A method of manufacture of electrode strands comprising winding wire in convolutions on a mandrel having areas substantially conforming to the desired strand shape and including formative areas of depression into which the strands are to be bent, increasing the circumferential length of convolutions to accord with the length needed to depress into said depressions, partially releasing the wound wire to create slack to the extent of the said increase of circumferential length of convolutions, taking up said slack and forming the convolutions in the formative areas of depression of the mandrel, heat-treating the convolutions thereby securing permanent set in the formed shape, and cutting the convolutions at a plurality of places in each convolution.

4. Means for manufacture of electrodes, comprising a mandrel having end flanges and a reduced transverse neck between said flanges providing a formative area of depression for wire wound around the mandrel, means lengthwise of the mandrel over which the wire is wound to space the wire thereat from the mandrel, said means being removable and thereby affording slack in the convolutions of wire around the mandrel, and means for pressing the wire into the formative area and for thereby taking up said slack therein.

5. Means for manufacture of electrodes, comprising a mandrel having end flanges and a reduced transverse neck between said flanges providing a formative area of depression for wire wound around the mandrel and means lengthwise of the mandrel over which the wire is wound to space the wire thereat from the mandrel, said means being removable and thereby affording slack in the convolutions of wire around the mandrel, a die depressable onto said neck for pressing the wire into the formative area and for thereby taking up said slack therein, and means for retaining said die in place whereby the convolutions are retained temporarily in formed condition thereby until set to form.

6. Means for manufacture of electrodes, comprising a mandrel having end flanges and a reduced transverse neck between said flanges providing a formative area of depression for wire wound around the mandrel, means lengthwise of the mandrel over which the wire is wound to space the wire thereat from the mandrel, said means being removable and thereby affording slack in the convolutions of wire around the mandrel, and means for pressing the wire into the formative area and for thereby taking up said slack therein, said flanges and mandrel having slits therein for admitting a cutter to pass transversely through the convolutions and sever the same into formed strands.

LEO C. WERNER.

REFERENCES CITED

The following references are of record in the file of this patent:

UNITED STATES PATENTS

| Number | Name | Date |
|---|---|---|
| 2,197,526 | Kosack | Apr. 16, 1940 |
| 822,445 | Hale | June 5, 1906 |
| 1,389,893 | Muck | Sept. 6, 1921 |
| 296,269 | Beaman | Apr. 1, 1884 |
| 332,622 | Potter | Dec. 15, 1885 |
| 649,847 | Hynes | May 15, 1900 |
| 532,410 | Alexander | Jan. 8, 1895 |
| 1,338,886 | Van Doorn | May 4, 1920 |
| 1,589,456 | Beghetti | June 22, 1926 |
| 2,183,635 | Barker | Dec. 19, 1939 |